United States Patent
Chilton (10) Patent No.: US 12,422,274 B2
(45) Date of Patent: Sep. 23, 2025

(54) METHODS AND SYSTEMS FOR HIGH DEFINITION MAP GENERATION

(71) Applicant: TORC Robotics, Inc., Blacksburg, VA (US)

(72) Inventor: Ryan Chilton, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 140 days.

(21) Appl. No.: 18/296,842

(22) Filed: Apr. 6, 2023

(65) Prior Publication Data

US 2024/0337503 A1    Oct. 10, 2024

(51) Int. Cl.
*G01C 21/00* (2006.01)
*E01C 23/22* (2006.01)

(52) U.S. Cl.
CPC ........ *G01C 21/3815* (2020.08); *E01C 23/222* (2013.01); *G01C 21/3848* (2020.08)

(58) Field of Classification Search
None
See application file for complete search history.

(56) References Cited

U.S. PATENT DOCUMENTS

| | | | |
|---|---|---|---|
| 2013/0190981 A1* | 7/2013 | Dolinar | F16M 11/10 348/148 |
| 2020/0292328 A1* | 9/2020 | Rabel | G01C 21/3841 |
| 2020/0393265 A1* | 12/2020 | Piao | G01C 21/3815 |
| 2021/0009137 A1* | 1/2021 | Herman | G01S 17/931 |
| 2021/0097308 A1* | 4/2021 | Kumar | G01S 17/89 |
| 2021/0103280 A1* | 4/2021 | Lacaze | E01C 23/163 |
| 2022/0221300 A1* | 7/2022 | Chikamori | G01C 21/3815 |
| 2023/0017969 A1* | 1/2023 | Mortier | G01C 21/3881 |

* cited by examiner

*Primary Examiner* — Anne Marie Antonucci
*Assistant Examiner* — Kyle S Park
(74) *Attorney, Agent, or Firm* — Armstrong Teasdale LLP (57) ABSTRACT

Disclosed herein are methods and systems (sensors) that allow revision of HD maps for lane lines as the lane lines are created. In a non-limiting example, a method comprises receiving, by a processor from a sensor associated with a vehicle configured to paint a lane line, a color attribute, a patterns attribute, and a location of a lane line painted on a road by the vehicle; determining, by the processor, using the location received from the sensor, whether the road has an existing lane line; and revising, by the processor, a high definition map associated with at least one autonomous vehicle by removing the existing lane line from the high definition map and inserting the lane line in the high definition map.

18 Claims, 5 Drawing Sheets

METHODS AND SYSTEMS FOR HIGH DEFINITION MAP GENERATION

TECHNICAL FIELD

The present disclosure relates generally to the generation and revision of maps used by autonomous vehicles.

BACKGROUND

Autonomous vehicles generally rely on high-definition (HD) maps for navigation. HD maps provide a detailed representation of the environment, including road markings, signs, curbs, and other features that are critical for autonomous vehicles to operate safely and efficiently. Autonomous vehicles must have a highly accurate representation of their environment to navigate safely, and any errors in the HD map can have serious consequences. For example, if an HD map incorrectly locates a curb, an autonomous vehicle may mistakenly drive into a sidewalk or other area that is not intended for vehicle traffic. However, generating and updating accurate HD maps faces various technical challenges.

First, ensuring the accuracy of HD maps requires extensive data collection and validation, which can be time-consuming and computationally expensive. For instance, generating an HD map in real-time (to be used in real-time to generate navigational decisions for the autonomous vehicle) requires high computing resources. Second, another challenge of HD map generation is keeping the maps up-to-date. Keeping HD maps current is essential for autonomous vehicles to operate effectively, but updating the maps in real-time is a complex and resource-intensive task. Additionally, the generation of HD maps requires large amounts of data. Autonomous vehicles use a variety of sensors, including cameras, LIDAR, and radar, to gather data about the environment. This data must be processed and combined to create the HD map, which can be a computationally intensive process.

SUMMARY

The systems and methods of the present disclosure may solve the problems set forth above and/or other problems in the art. Using the methods and systems discussed herein, an autonomous vehicle may efficiently generate HD maps. Specifically, using the methods and systems discussed herein a processor may generate an HD map (at least partially) based on data collected when road signs are created (e.g., lane markings are painted).

Using the methods and systems discussed herein, a processor associated with an autonomous vehicle and/or HD maps may capture changes to painted road markings at the time of their physical creation and/or modification (whether addition or removal) by roadwork crews. Using the methods and systems discussed herein, a processor can be in communication with one or more sensors, capture roadwork data, analyze the data, and transmit the data to a data repository for use by vehicle entities, such as autonomous vehicle navigation systems or other autonomy systems.

Instead of solely relying on observation-based mapping procedures to detect changes and update the HD map after roadwork operations have made changes, the methods and systems discussed herein can capture changes to road markings (e.g., lane lines) as they are physically being created (e.g., by instrumenting certain construction vehicles that are capable of adding or removing lane lines).

The methods and systems discussed herein can also allow a suite of sensors to be retroactively added to construction vehicles, such that the construction vehicle can provide pertinent data to a processor that can update a data repository in real-time or near real-time and revise various features of one or more HD maps.

In one embodiment, a method may comprise receiving, by a processor from a sensor associated with a vehicle configured to paint a lane line, a color attribute, a pattern attribute, and a location of a lane line painted on a road by the vehicle; determining, by the processor, using the location received, whether the road has an existing lane line; and revising, by the processor, a high-definition map associated with at least one autonomous vehicle by removing the existing lane line from the high-definition map and inserting the lane line in the high definition map.

The location may be received from the processor responsive to the sensor detecting the location. The location may be received from the processor in real-time as the lane line is painted on the road. The high-definition map may be revised in real-time as the lane line is painted on the road.

In another embodiment, a method may comprise monitoring, by at least one processor from a sensor, a color value, a pattern attribute, and a location of a lane line painted on a road by a vehicle; and transmitting, by the at least one processor, the color value, the pattern attribute, and the location of the lane line to a processor, whereby the at least one processor revises a high-definition map based on received data from the sensor.

The location may be received from the processor responsive to the sensor detecting the location. The location may be monitored in real-time as the lane line is painted on the road. The high-definition map may be revised in real-time as the lane line is painted on the road.

In yet another embodiment, a system may comprise a non-transitory computer readable medium containing instructions that are executed by at least one processor configured to: receive, from a sensor associated with a vehicle configured to paint a lane line, a color attribute, a pattern attribute, and a location of a lane line painted on a road by the vehicle; determine using the location received, whether the road has an existing lane line; and revise a high-definition map associated with at least one autonomous vehicle by removing the existing lane line from the high-definition map and inserting the lane line in the high definition map.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
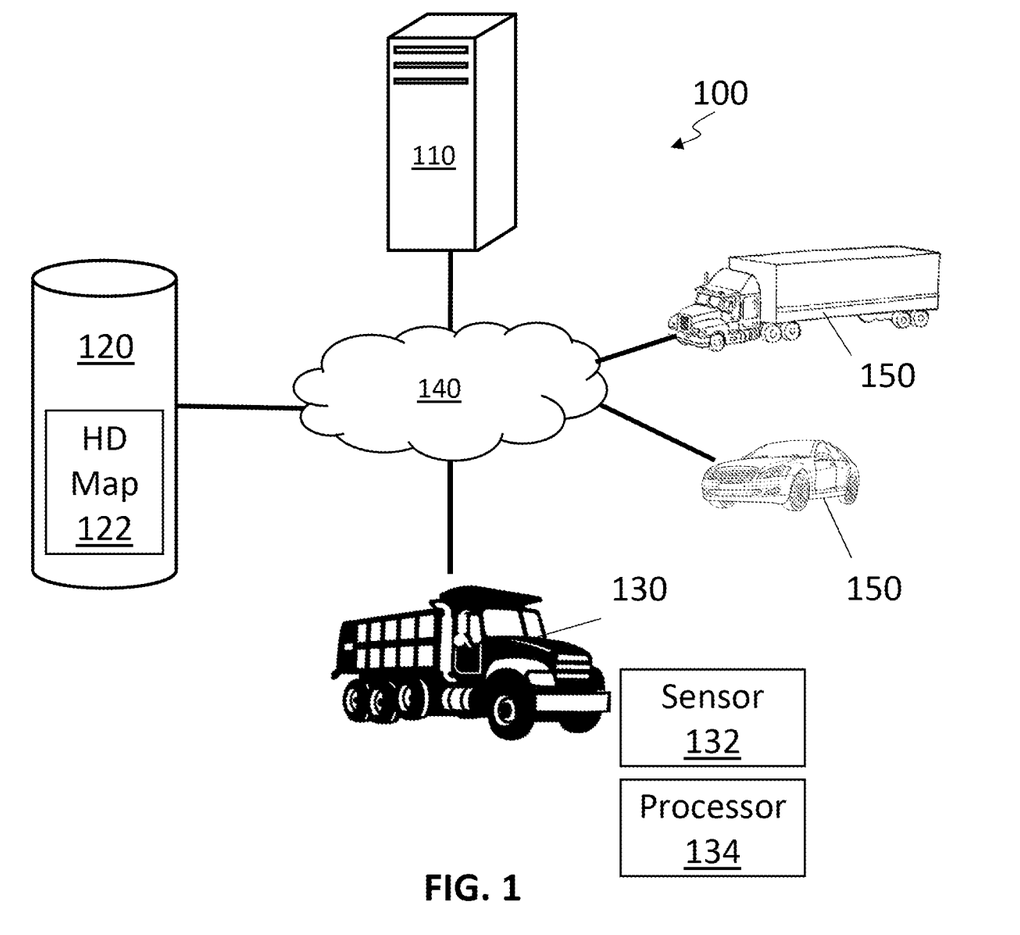
FIG. 1 depicts a system diagram of a map generation and revision system, according to an embodiment.

FIG. 1 is a non-limiting example of components of a map generation and revision system 100 in which a server 110 operates. The server 110 may utilize features described in FIG. 1 to generate and/or revise one or more HD maps using one or more sensors of a construction vehicle 130. The system 100 is not confined to the components described herein and may include additional or other components not shown for brevity, which are to be considered within the scope of the embodiments described herein.

The features depicted in FIG. 1 may be connected through a network 140. The examples of the network 140 may include, but are not limited to, private or public LAN, WLAN, MAN, WAN, and the Internet. The network 140 may include both wired and wireless communications according to one or more standards and/or via one or more transport mediums.

The communication over the network 140 may be performed in accordance with various communication protocols such as Transmission Control Protocol and Internet Protocol (TCP/IP), User Datagram Protocol (UDP), and IEEE communication protocols. In one example, the network 140 may include wireless communications according to Bluetooth specification sets or another standard or proprietary wireless communication protocol. In another example, the network 140 may include communications over a cellular network, including, e.g., a GSM (Global System for Mobile Communications), CDMA (Code Division Multiple Access), and/or EDGE (Enhanced Data for Global Evolution) network.

The server 110 may be any computing device comprising a processor and non-transitory, machine-readable storage capable of executing the various tasks and processes described herein. The server 110 may employ various processors such as a central processing unit (CPU) and graphics-processing unit (GPU), among others. Non-limiting examples of such computing devices may include workstation computers, laptop computers, server computers, and the like. While the system 100 includes a single server 110, the server 110 may include any number of computing devices operating in a distributed computing environment, such as a cloud environment.

The server 110 may be associated with an autonomy system that uses various methods to provide autonomous vehicle navigation for one or more autonomous vehicles 150. In some embodiments, the autonomous vehicles may use an HD map that is stored in a data repository, such as a database 120. The database 120 may be any data repository (e.g., relational database) configured to store data, such as the HD map 122. The database 120 may be in communication with the server 110, such that the data records are stored within the database 120. As used herein an HD map refers to any map that can be used by an autonomous vehicle for navigational purposes.

The system 100 may also include a construction vehicle 130 that is configured to install and/or remove lane lines on roadways. As used herein, a lane line refers to any road marking, such as median lines, cross walks, and the like. The construction vehicle 130 may comprise a lane marking module or apparatus that may be mounted on the construction vehicle 130. The lane marking module may include multiple spray nozzles and one or more paint reservoirs. The lane marking module may be connected (e.g., in communication with) to a control system that allows an operator to adjust the location, width, length, and color of the lane line as well as control the speed and position of the construction truck.

Moreover, the control system may be configured to create different lane line patterns. For instance, the lane-marking module can be configured to apply a single solid or broken line, or multiple lines of different colors, to the road surface. The spray nozzles can be adjusted to vary the width and length of the line, and the paint reservoir can be filled with any suitable paint material of different colors (e.g., white, yellow, red, or green). The control system may allow the operator to input desired parameters, such as line length, width, and color, which are then executed by the lane marking module as the construction vehicle 130 moves forward.

The construction vehicle 130 may also be equipped with a lane line removal module that can remove existing lane lines by means of any removal protocol, such as scraping the pavement or high-pressure water jet. The removal module may be mounted on the construction vehicle 130 and may be coupled to a water supply and the control system that may allow the operator to adjust the pressure and position of the water jet, which is used to effectively and efficiently remove existing lane lines. In some embodiments, the construction vehicle 130 can be driven along a roadway to add or remove lane lines as needed. The control system may allow the operator to precisely adjust the position and speed of the construction vehicle 130 and its operations, ensuring that the lane lines are applied or removed accurately and efficiently.

The construction vehicle 130 may also include one or more sensors (e.g., represented by the sensor 132) that can sense data associated with where and how the lane lines were added or removed. For instance, the sensor 132 may retrieve data indicating the location of the lane lines, the color associated with the lane lines, the pattern of the lane lines, and any other attribute that could be used (by the server 110) to revise one or more data record within the database 120, such as the HD map 122.

The construction vehicle 130 may also include a processor 134 that can communicate with the sensor 132 and the server 110. The processor 134 may then transmit the data to the server 110 for analysis and revision of the HD map 122.

The processor 134 may use a Global Navigation Satellite System (GNSS) to identify the location of the lanes being removed or added. For instance, the processor 134 may use any network of satellites that transmit signals to GPS (Global Positioning System) receivers of the construction vehicle 130 and/or the processor 134. The processor 134 may use these signals to determine the receiver's precise location, velocity, and time. The sensor 132 may also include a sensor or electrical interface to sense when paint is being sprayed (or when asphalt scraping is active). For instance, the control system can determine when the sprayer is active, which color is being used, and what pattern is being painted (broken line or solid). In some embodiments, the construction vehicle 130 may have a data logging system in communication with its control system. The processor 134 may retrieve log data (from the control system of the construction vehicle 130) that may indicate how the lane lines were painted. The processor 134 may then transmit the retrieved data to the server 110.

The processor 134 may use a communication module configured to communicate with the server 110. For instance, the processor 134 may include antennas or any other wired/wireless communication protocol or apparatus allowing the data received from the sensor 132 to be transmitted to the server 110.

Figure 2:
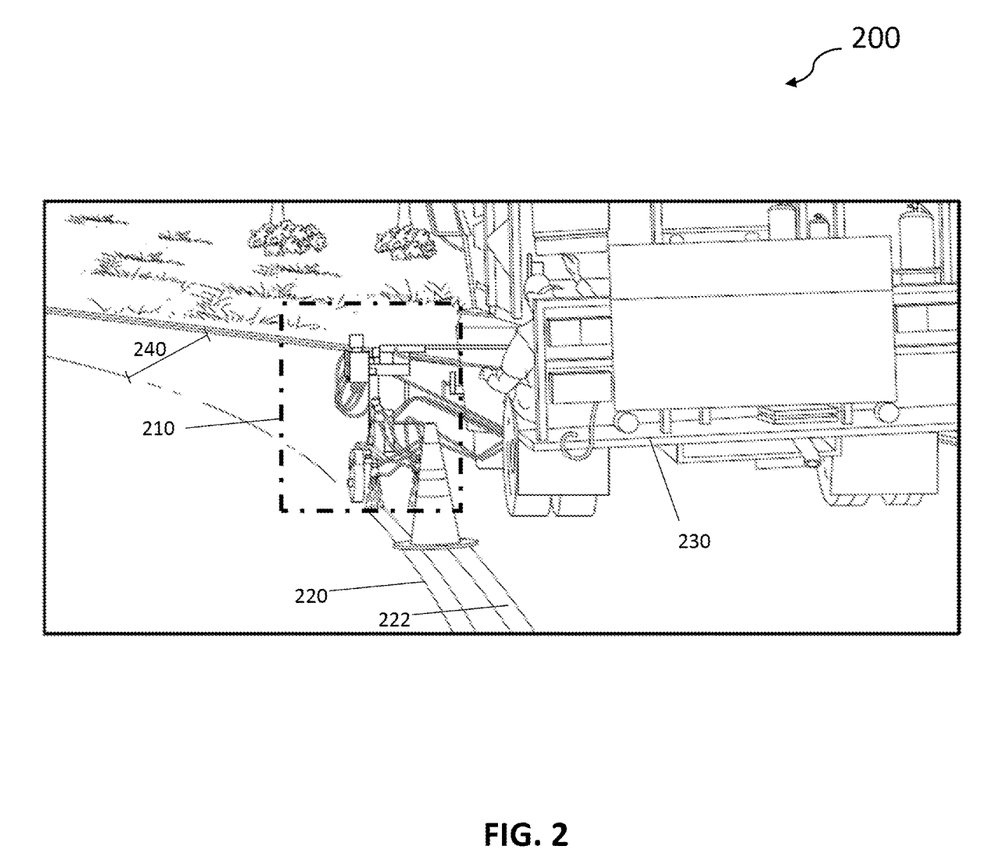
FIG. 2 depicts a construction vehicle with a sensor, according to an embodiment.

In a non-limiting example, the construction vehicle 130 may have an attachment that sprays paint onto the road. For instance, an attachment may include the lane marking module and the lane removal module. The sensor 132 and/or the processor 134 can be placed directly over the attachment (or over the vehicle if an additional configuration step is added) to sense the location of the tool, as depicted in FIG. 2. As the operator activates or deactivates the sprayer, this information along with the position is monitored, logged, and reported up to the server 110 by the processor 134. For instance, the processor 134 may use a location tracking protocol (e.g., GPS) to periodically retrieve a location of the attachment. The sensor 130 may then sense that a sprayer of the construction vehicle 130 uses a paint reservoir (having white color) to paint the lane lines. As a result, the processor 134 transmits data to the server 110 indicating the location of the lane line, color of the lane line, and (when applicable) a pattern of the lane line. The data received by the server 110 can indicate how HD map 122 should be revised. Using the methods discussed herein, the server 110, may revise the HD map 122 accordingly.

FIG. 2 depicts a construction vehicle having a lane marking module and a lane removal module and a sensor discussed herein, according to an embodiment. The embodiment 200 depicts a construction vehicle 230 that is equipped with lane line painting and removal attachment 210 (attachment 210). The attachment 210 may include a sensor and/or a processor, such as the sensor 132 and/or the processor 134 discussed in FIG. 1. Using various construction equipment, such as paint sprays or asphalt scraping tools, the construction vehicle 230 may use the attachment 210 to paint lane lines 220 and 222. The sensor of the attachment 210 may sense data associated with how the lane lines 220 and 222 are painted. Specifically, the sensor may sense data indicating location of the lane lines 220 and 222 (e.g., distance 240), each lane line's curvature data, pattern data (e.g., double solid lines), and a color of each lane line. The processor then transmits the data sensed by the sensor to a server, such as the server 110, depicted in FIG. 1.

Figure 3:
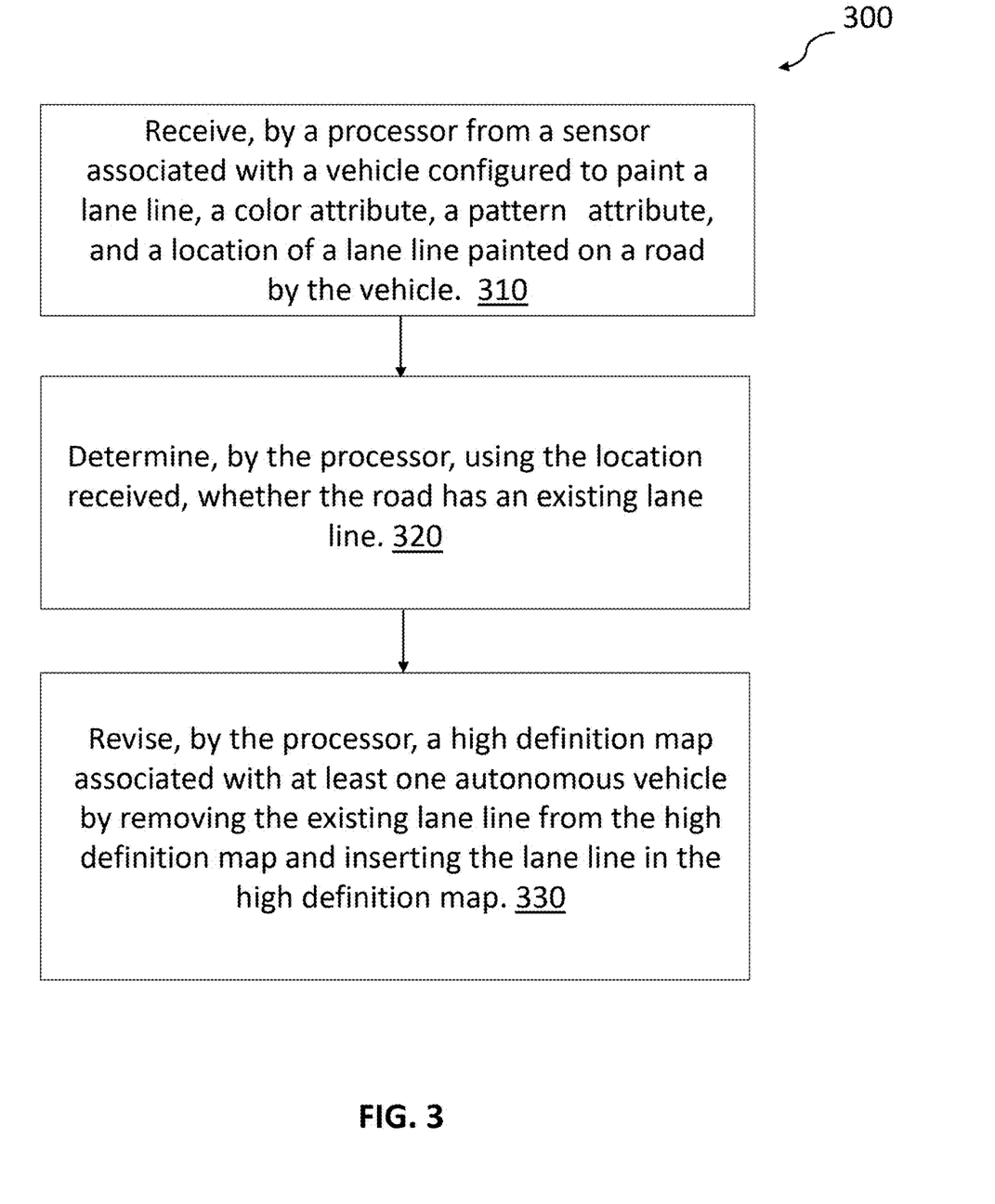
FIG. 3 depicts a flowchart of a method executed in a map generation and revision system, according to an embodiment.

FIG. 3 depicts a flowchart of a method executed in a map generation and revision system, according to an embodiment. The method 300 shown in FIG. 3 comprises execution steps 310-330. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 3 is described as being performed by a processor, such as the server 110 depicted in FIG. 1. However, in some embodiments, one or more of the steps may be performed by a different processor, server, or any other computing feature. For instance, one or more of the steps may be performed via a cloud-based service or another processor in communication with the processor of the autonomous vehicle and/or its autonomy system. Although the steps are shown in FIG. 3 having a particular order, it is intended that the steps may be performed in any order. It is also intended that some of these steps may be optional. The method 300 is described as being executed by a processor. As used herein, the processor can be any processor or server, such as the server 110 described in FIG. 1.

Using the method 300, the processor may revise an HD map that is used to navigate autonomous vehicles as the lane lines are created (e.g., painted) or removed. Even though aspects of the present disclosure discusses lane lines, the method 300 is applicable to any road markings, such as crosswalks, lines indicating parking spots, pavement lines, and the like.

In an embodiment of the step 310, the processor may receive, from a sensor (e.g., color sensor or light sensor) associated with a vehicle configured to paint a lane line, a color attribute, a pattern attribute, and a location of a lane line painted on a road by the vehicle. The processor may be in communication (real-time or near real-time) with a sensor of a vehicle configured to paint one or more lane lines on a road. The sensor may monitor activities of the vehicle and record its activities. For instance, the sensor may have a processor that is in communication with multiple other sensors. One of the sensors may use a location tracking protocol (e.g., GPS sensors) to identify a location (e.g., GPS coordinates) of where the lane line has been painted.

The sensor may also capture data associated with a color used to paint the lane lines. For instance, the vehicle may include multiple paint reservoirs where each reservoir includes a particular color of paint (e.g., white, green, yellow, or red). The sensor may determine which reservoir is being used to paint the lane lines. When used in conjunction with the location data, a server/processor may determine a color of the lane line.

The sensor may also capture data indicating a pattern of how the lane line was painted. For instance, a sensor may monitor how a paint sprayer was used to paint the lane lines (e.g., monitor timing and/or a pattern of how the sprayer sprayed the paint). As a result, the sensor may determine how the lane line was painted. For instance, some lane lines may be painted as solid or broken. The sensor may capture data indicating these patterns by determining that the sprayer sprayed the lane line in a continuous manner (indicating a solid line) or intermittently (indicating dashed or broken lines).

Accordingly, the sensor (or collection of sensors) can collect the location of the lane lines, colors of the lane lines, and a pattern of the lane line that is painted via the construction vehicle.

In an embodiment of the step 320, the processor may determine, using the location received from the sensor, whether the road has an existing lane line. Using the information received from the sensor, the processor may query and retrieve an HD map associated with the location of the lane line. For instance, the processor may identify an HD map of the area that the lane lines are located.

In an embodiment of the step 330, the processor may revise a high-definition map associated with at least one autonomous vehicle by removing the existing lane line from the high-definition map and inserting the lane line in the high-definition map.

Using various methods discussed herein, the processor may revise one or more datasets to indicate the new lane lines. The processor may also remove the previous/existing lane lines within the HD map.

The HD map revisions may be done locally or using a central HD map. For instance, in some embodiments, the processor may revise one or more data records within a database (e.g., database 120 depicted in FIG. 1) to indicate the HD map revisions. For instance, the processor may use a central HD map that can be transferred to different autonomous vehicles, such that the autonomous vehicles use the HD map (in accordance with their present location) to navigate themselves. Additionally or alternatively, the processor may locally change an HD map when an autonomous vehicle is near (e.g., within a predetermined distance) away from the location of the lane change. For instance, when the autonomous vehicle is traveling towards an area known to be associated with a lane change, the processor may transmit instructions to the autonomous vehicle's autonomy system to change the HD map, such that the new lane lines are reflected.

The revised HD map may reflect all the data received from the sensor. For instance, the revised HD map may indicate the location of the new lane lines, such that the new lane geometry (e.g., the width of each lane) is reflected. In another example, the revised HD map may indicate data that correspond to the color and/or pattern of the new lane lines. The processor may query local rules (e.g., local to where the lanes are located, such as state or federal law) and regulations to identify one or more laws applicable to lane lines based on their color and/or pattern. As used herein, the pattern of a lane line may indicate whether the lane line is solid or dashed, single or double and whether (if double) each side has the same pattern (e.g., some lane lines are dashed on one side and solid on another side).

In an example, if the lane line has a white color, the processor may determine that the lane line is used to separate traffic going in the same direction. These lines are commonly used on two-lane roads and highways to help keep vehicles in their proper lane. If the lane line has a yellow color, the processor may determine that the lane line is used to separate traffic moving in opposite directions. Yellow lane lines are generally used to mark the centerline of roads and highways. On some roads, the yellow centerline may be broken, indicating that it's safe to pass another vehicle. On other roads, the yellow centerline may be solid, indicating that passing is not allowed. Two parallel yellow lines may indicate that passing is not allowed in either direction. However, if one side of the lane lines is in broken lines (e.g., dashed), passing may be permitted on that side of the road. In another example, data received from the sensors may indicate that the lane lines are in red. Red pavement markings may be used to indicate areas where stopping or parking is prohibited. This may include areas around fire hydrants, crosswalks, and intersections. In another example, green pavement markings may be used to indicate the location of bicycle lanes, which are exclusive lanes for the use of bicycles.

As discussed above, line patterns may also be interpreted within the HD map, such that the information can be used for navigating autonomous vehicles. The following may be non-limiting examples of line patterns and how they may be interpreted (based on local laws and regulations identified by the processor):

Solid line: A solid line may be used to indicate that changing lanes is not allowed. If a solid white line separates two lanes of traffic moving in the same direction, for example, the HD map may indicate that autonomous vehicles are not permitted to cross the line to change lanes. If a solid yellow line separates two lanes of traffic moving in opposite directions, the HD map may indicate that autonomous vehicles are not allowed to cross the line to pass another vehicle.

Broken line: A broken line may be used to indicate that changing lanes is permitted. If a broken white line separates two lanes of traffic moving in the same direction, for example, the HD map may indicate that autonomous vehicles may cross the line to change lanes when it is safe to do so. If a broken yellow line separates two lanes of traffic moving in opposite directions, the HD map may indicate that autonomous vehicles may cross the line to pass another vehicle when it is safe to do so.

Double solid line: A double solid line may be used to indicate that changing lanes is not allowed in either direction.

Zigzag line: A zigzag line may be used to indicate the location of a crosswalk. The HD map may indicate that autonomous vehicles should be extra cautious in these areas, as pedestrians may be crossing the road. For instance, the HD map may indicate a need for a reduction in the velocity of the autonomous vehicle.

Diagonal lines: Diagonal lines may be used to indicate areas where stopping or parking is prohibited. This may include areas around fire hydrants, crosswalks, and intersections.

Additionally or alternatively, the orientation of the lines painted may also be interpreted within the HD map. For instance, if the painted lines are perpendicular to the lanes, the painted lines may indicate a crosswalk and not lane lined.

Using the information received, the processor may revise an HD map to reflect the newly painted lane lines. In some embodiments, the processor may use the same method to determine that a lane line is being removed. Accordingly, the processor may revise an HD map. In some embodiments, the processor may not identify an existing lane line or other information. These embodiments may indicate that the road being painted did not include any painted lane lines. As a result, instead of revising the HD map, the processor may generate new/additional data records indicating the lanes.

In some embodiments, a representation (visual or otherwise) of the HP map may be displayed using a variety of methods. For instance, a server (e.g., server 110) may transmit an HP map that has been updated using the methods and systems discussed herein to a display device, such that it can be updated. For instance, the HD maps depicted in FIGS. 4-5 can be displayed or transmitted to another processor to be displayed. In a non-limiting example, the HD map may be displayed on a screen of a vehicle (or the construction vehicle), such as a car display, smart windshield, mobile device, and the like. In other embodiments, the HD map itself may be transmitted to a third-party server, so that it can be used for navigational or other purposes.

Figure 4:
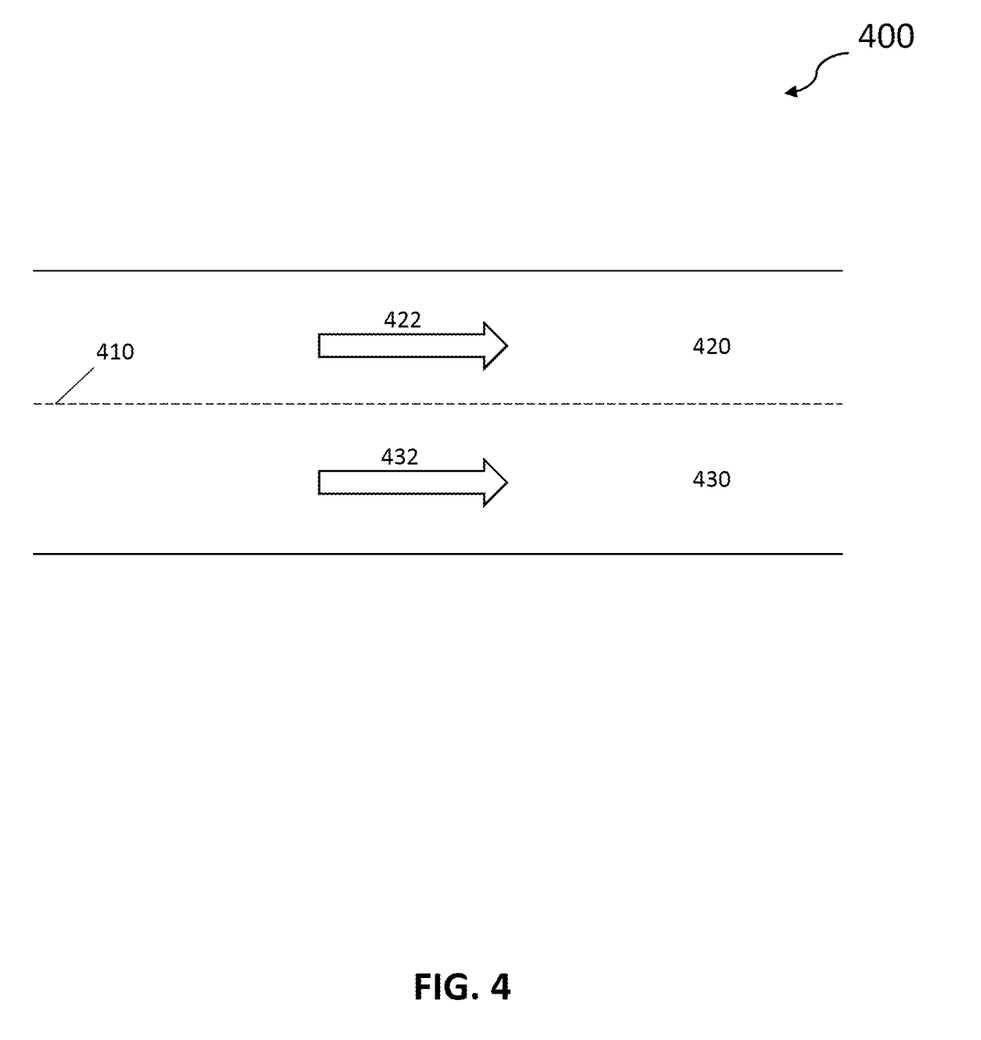
FIGS. 4-5 depict bird's-eye views of roadway scenarios including schematic representatives of lane line changes, according to an embodiment.
Figure 5:
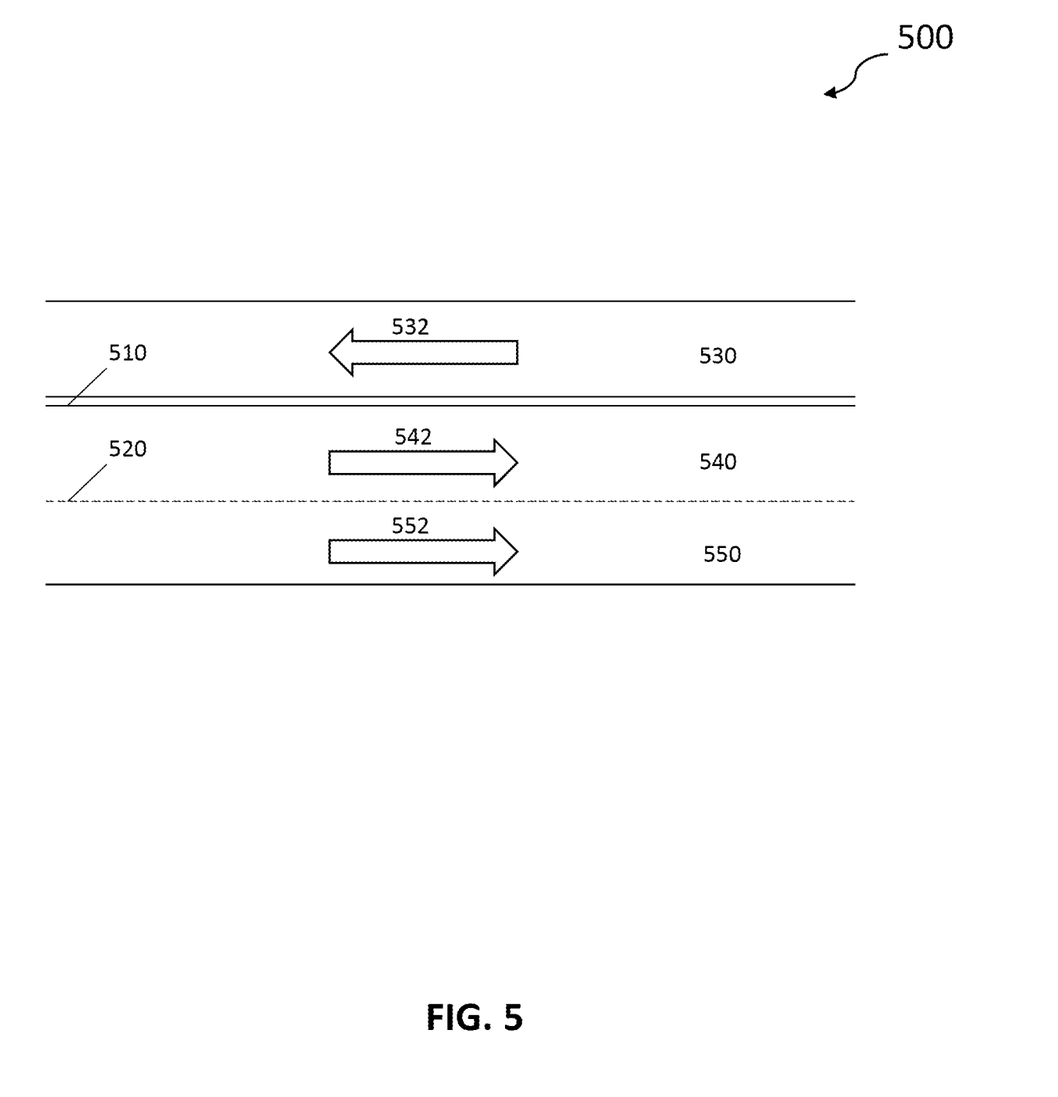

FIGS. 4-5 illustrate how a representation of the lane lines (within an HD map) can be revised using the methods and systems discussed herein. Specifically, the roads 400 and 500 represent HD maps of roads. FIG. 4 illustrates an HD map of a road 400 having a lane line 410 that divides the road 400 into lanes 420 and 430. Because the lane line 410 is a single broken line, the HD map indicates that the lanes 420 and 430 have directions of travel 422 and 432 (e.g., same direction). Moreover, because the lane line 410 is a single broken line, the HD map of the road 400 indicates that cars in either lane can be passed.

FIG. 5 illustrates an HD map of the road 500. The road 500 may be the same as the road 400 that has been repainted (e.g., the lane lines are reconfigured). Accordingly, the HD map of the road 500 may be revised using the methods and systems discussed herein because the lane line 410 is removed and the lane lines 510 and 520 are added. The removal and addition of the lane lines may be performed using a construction vehicle that include a sensor, such as the construction vehicle discussed in FIGS. 1-3. When the construction vehicle removes the lane line 410, the processor may remove its representation from the HD map of the road 500. Moreover, as the construction vehicle adds the lane lines 510 and 520, the processor may revise the HD map of the road 500 to include the lane lines 510 and 520 (using location data received from the sensor, such as lane width or curvature of each lane line).

The sensor may also indicate that the lane line 520 is a single broken lines and the lane line 510 is a double solid line. As a result, the processor may determine that the lanes 540 and 550 have the directions 542 and 550 (same direction) where cars can legally change lanes between the lanes 540 and 550 (passing is allowed). In contrast, because of the pattern of the lane line 510, the processor determines the direction 532 for the lane 530.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    receiving, by a processor from a sensor associated with a vehicle configured to paint a lane line, a color attribute, a pattern attribute, and a location of the lane line painted on a road by the vehicle;
    determining, by the processor, using the location received, whether the road has an existing lane line;
    revising, in real-time, by the processor, a high-definition digital map associated with at least one autonomous vehicle by removing the existing lane line from the high-definition digital map and inserting the lane line in the high-definition digital map at the time of line painting to enable real-time updates to the high-definition digital map; and
    transmitting, by the processor, instructions to an autonomy computing system of an autonomous vehicle to change to a revised high-definition digital map, wherein the autonomy computing system is configured to control operation of the autonomous vehicle to navigate according to the revised high-definition digital map.

2. The method according to claim 1, wherein the location is received from a second sensor associated with the vehicle.

3. The method according to claim 2, wherein the location is received by the processor in real-time as the lane line is painted on the road.

4. The method according to claim 1, wherein the sensor monitors a paint reservoir associated with the vehicle.

5. The method according to claim 1, further comprising:
    displaying, by the processor, a representation of the high-definition digital map.

6. The method according to claim 1, further comprising:
    transmitting, by the processor, the revised high-definition digital map to a second processor.

7. The method according to claim 1, wherein the pattern attribute indicates whether the lane line is solid or dashed.

8. A system comprising:
a non-transitory computer readable medium containing instructions that are executed by at least one processor configured to:
receive, from a sensor associated with a vehicle configured to paint a lane line, a color attribute, a pattern attribute, and a location of the lane line painted on a road by the vehicle;
determine using the location received, whether the road has an existing lane line;
revise, in real time, a high-definition digital map associated with at least one autonomous vehicle by removing the existing lane line from the high-definition digital map and inserting the lane line in the high-definition digital map at the time of line painting to enable real-time updates to the high-definition digital map; and
transmit, by the at least one processor, instructions to an autonomy computing system of an autonomous vehicle to change to a revised high-definition digital map, wherein the autonomy computing system is configured to control operation of the autonomous vehicle to navigate according to the revised high-definition digital map.

9. The system according to claim 8, wherein the location is received from a second sensor associated with the vehicle.

10. The system according to claim 9, wherein the location is received by the at least one processor in real-time as the lane line is painted on the road.

11. The system according to claim 8, wherein the sensor monitors a paint reservoir associated with the vehicle.

12. The system according to claim 8, wherein the instructions further cause the at least one processor to:
display a representation of the high-definition digital map.

13. The system according to claim 8, wherein the instructions further cause the at least one processor to:
transmit the revised high-definition digital map to a second processor.

14. The system according to claim 8, wherein the pattern attribute indicates whether the lane line is solid or dashed.

15. A method comprising:
monitoring, in real-time, by at least one processor from a sensor, a color value, a pattern attribute, and a location of a lane line painted on a road by a vehicle at the time of line painting;
transmitting, by the at least one processor, the color value, the pattern attribute, and the location of the lane line to a second processor, whereby the at least one processor revises, in real-time, a high-definition digital map based on received data from the sensor at the time of line painting to enable real-time updates to the high-definition digital map; and
transmitting, by the at least one processor, instructions to an autonomy computing system of an autonomous vehicle to change to a revised high-definition digital map, wherein the autonomy computing system is configured to control operation of the autonomous vehicle to navigate according to the revised high-definition digital map.

16. The method according to claim 15, wherein the pattern attribute indicates whether the lane line is solid or dashed.

17. The method according to claim 15, wherein the location is monitored in real-time as the lane line is painted on the road.

18. The method according to claim 15, wherein the second processor uses the color value, the pattern attribute, and the location of the lane line to update the high-definition digital map in real time.

* * * * *